United States Patent [19]

Johnson et al.

[11] Patent Number: 4,504,922
[45] Date of Patent: Mar. 12, 1985

[54] CONDITION SENSOR

[75] Inventors: Richard A. Johnson; Hans G. Mattes, both of Indianapolis, Ind.

[73] Assignee: AT&T Bell Laboratories, Murray Hill, N.J.

[21] Appl. No.: 437,313

[22] Filed: Oct. 28, 1982

[51] Int. Cl.³ .................. G05D 23/24; G05D 23/20
[52] U.S. Cl. ............................ 364/557; 307/117; 374/170
[58] Field of Search ............... 364/557; 374/183, 184, 374/178, 170, 185; 338/22; 323/369; 340/584; 324/105; 307/117

[56] References Cited

U.S. PATENT DOCUMENTS

| | | | |
|---|---|---|---|
| 4,161,880 | 7/1979 | Prosky | 364/557 |
| 4,172,982 | 10/1979 | Kompelien | 307/117 |
| 4,186,315 | 1/1980 | Benton | 307/117 |
| 4,196,356 | 4/1980 | Kabat | 307/117 |
| 4,211,113 | 7/1980 | Harrison | 374/170 |
| 4,297,851 | 11/1981 | Paddock et al. | 374/183 |
| 4,300,199 | 11/1981 | Yoknis et al. | 364/557 |
| 4,370,070 | 1/1983 | Leroux | 374/170 |

OTHER PUBLICATIONS

Radio Electronics, Jun. 1978—"Microprocessor-Based Solar Controller"—Dave Corbin.

Primary Examiner—Errol A. Krass
Assistant Examiner—Donna Angotti
Attorney, Agent, or Firm—Joseph P. Kearns

[57] ABSTRACT

A microprocessor controlled condition sensor comprising a parallel multiport microprocessor, precision resistor, capacitor, and one or more transducers (e.g., thermistor) determines the value of the condition being sensed (e.g. temperature) by calculating the resistance of the transducer through the ratio of interval 0/1 threshold timings determined by the RC time constants of precision resistor-capacitor and transducer-capacitor connections. The value of the condition (e.g., temperature) is subsequently obtained via a lookup table within the microprocessor which contains the relationship between transducer resistance and condition magnitude.

9 Claims, 5 Drawing Figures

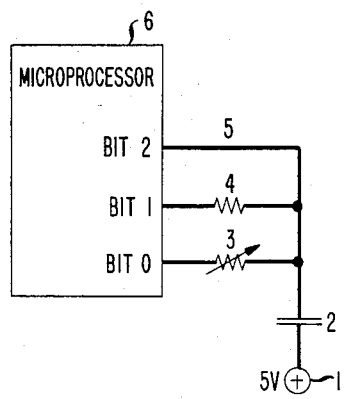
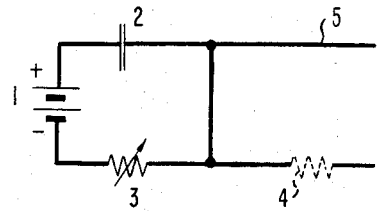
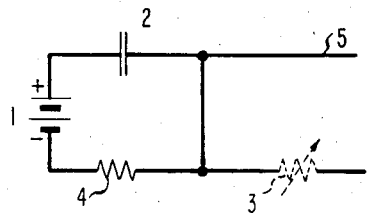
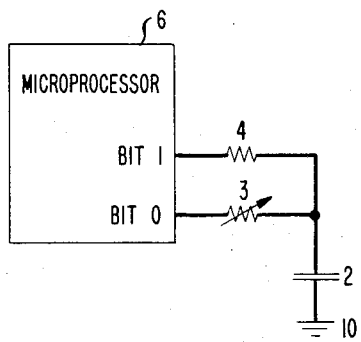
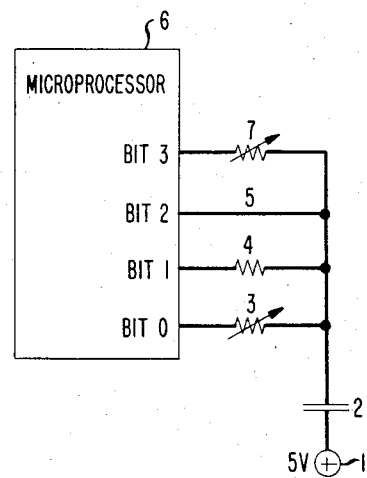

CONDITION SENSOR

FIELD OF THE INVENTION

This invention relates to an apparatus for sensing one or more conditions through transducers whose resistance bears a known relation to the magnitude of the condition being sensed, and more particularly, to such an apparatus that is microprocessor controlled.

BACKGROUND OF THE INVENTION

Microprocessor control of physical conditions is becoming more widespread as computerized systems are found to control functions with optimum efficiency. In a microprocessor-based solar controller (see in this connection "Microprocessor-Based Solar Controller" by Dave Corbin published in *Radio Electronics*, June 1978, at page 94, analog temperature information is converted into digital data through an analog-to-digital converter (ADC) to process information as efficiently and as accurately as possible. Other known microprocessor-controlled sensing devices make use of frequency oscillators with transducer dependent frequencies. The oscillator frequency is slow enough for the microprocessor to count cycles and, by doing so, determine from the timing the resistance of the transducer (e.g., thermistor). The resistance, in turn, determines the magnitude of the condition being sensed (e.g., temperature).

In contrast to the aforementioned condition sensors, the present invention measures conditions without the use of an external oscillator or ADC (analog-to-digital converter).

SUMMARY OF THE INVENTION

The improved condition sensor of this invention comprises a capacitor, precision resistor, transducer and parallel port microprocessor. The ratio of two internal threshold timings determines the resistance of the transducer resistance which, in turn, is proportional to the magnitude of the condition being sensed.

Advantages of the present invention include lower cost and fewer components resulting in overall circuit simplification.

It is an object of this invention to provide apparatus for measuring resistance within a condition sensitive transducer for purposes of determining the value of that condition.

It is another object of this invention to realize a simple microprocessor-controlled condition sensor that does not make use of an external oscillator or ADC, A further object of this invention is to provide an improved apparatus for measuring temperature using a parallel multiport microprocessor.

BRIEF DESCRIPTION OF THE DRAWING

Other objects, advantages and features of the present invention will become evident through a reading of the following detailed description of the preferred embodiment in conjunction with the drawing in which:

FIG. 1 is a schematic diagram of an illustrative embodiment of a microprocessor-controlled temperature sensor;

FIG. 2 illustrates a simplification of FIG. 1 at one stage in the process of temperature determination;

FIG. 3 illustrates a further simplification of FIG. 1 at another stage in temperature determination;

FIG. 4 is a schematic diagram of an alternate embodiment of FIG. 1; and

FIG. 5 is a schematic diagram of the temperature sensor serving to illustrate how sensing of plural conditions is implemented.

DETAILED DESCRIPTION

A temperature sensor is realized through a parallel multiport microprocessor, one or more thermistors, a capacitor, a precision resistor and a voltage source. Temperature is determined via the calculation of the resistance of a thermistor from the ratio of threshold times for attaining equal charging or discharging levels in resistor-capacitor and thermistor-capacitor combinations.

Referring to the embodiment in FIG. 1 of the drawing, the steps for determining the temperature sensed by thermistor 3 are as follows. First, the port labeled bit 2, and the sensing bit, is made an input port 5 and bits 0 and 1 are made output ports to thermistor 3 and precision resistor 4. A logical 0 appears initially at each of the ports labeled bit 0 and bit 1. Capacitor 2 is tied to a five-volt d.c. power supply source at pin 1 at its lower end and to a logical 0 or ground at the upper end through termistor 3 and reference resistor 4. Capacitor 2 therefore rapidly changes to the five-volt level. Bit 1 is now switched to become a high-impedance input port. The high impedance resulting causes precision resistor 4 to appear as an open circuit. Bit 0 is reset to logical 1. Capacitor 2 discharges through thermistor 3 toward ground level. Thus, the potential on input port 5 connected to sensing bit 2 crosses a 0/1 threshold. The time to reach this threshold is observed and stored in microprocessor 6.

FIG. 2 is a equivalent circuit of the arrangement of FIG. 1 at this stage. Dashed line 4 represents the high impedance or open circuit resulting when bit 1 is made an input port. When a logical 1 appears at bit 0 port, capacitor 2 discharges at a rate determined by the resistance thermistor 3 and capacitance of capacitor 2, which provide together an RC time constant. Microprocessor 6 counts the number of cycles transpiring until bit 2 at port 5 is driven to a logical 1 input. This timing is executed by an increment sensitive counter within parallel port microprocessor 6.

Second, bit 1 and bit 0 ports are reinitialized at logical 0. Capacitor 2 recharges. Bit 0 is now switched to become a high impedance input port. The high impedance causes thermistor 3 to appear as an open circuit. Bit 1 is reset to logical 1. Capacitor 2 now discharges through precision resistor 4 toward ground level. Thus, the potential on input port 5 connected to sensing bit 2 crosses the same 0/1 threshold as before. The new time to reach this threshold is observed and stored in microprocessor 6.

FIG. 3 is an equivalent circuit of the arrangement of FIG. 1 at this stage. Dashed line 3 represents the high impedance or open circuit resulting when bit 0 is made an input port. The rate of discharge of capacitor 2 is determined by the resistance of reference resistor 4 and the capacitance of capacitor 2, which provide together a different RC time constant. Microprocessor 6 again counts the number of cycles transpiring until bit 2 at port 5 is driven to across the same 0/1 threshold to logical 1.

Third, once the two timings have been recorded in memory, their ratio is taken, the resistivity of thermistor 3 is calculated and the temperature determined by way of a precalculated lookup table within microprocessor 6.

The following equations outline how the temperature is realized through these two timings.

The threshold voltage, $V_t$, or the voltage at which sensing bit 2 makes its 0/1 transition is determined by:

$$V_t = V_i e^{-t/RC} \quad (1)$$

where $V_i$ = initial voltage at bit 2;
t = time for threshold level to be reached;
R = resistance (e.g., precision resistor 4 or thermistor 3); and
C = capacitance 2.

The threshold voltage $V_t$ of port 5 is equal for both RC time constants derived from precision resistor 4 and thermistor 3 hence:

$$V_t = V_i e^{-t_r/CR_r} = V_i^{-t_{th}/CR} \quad (2)$$

where $t_r$ = threshold time for precision resistor 4 RC time constant;
C = capacitance of capacitor 2;
$R_r$ = resistance of precision resistor 4;
$t_{th}$ = threshold time for RC time constant of thermistor 3; and
$R_{th}$ = resistance of thermistor 3.

Dividing both sides of $V_i$ and taking the logarithm of these results yeilds:

$$t_r/t_{th} = R_r/R_{th}. \quad (3)$$

It is from this relationship of equation (3) and from the resistance of precision resistor 4 that thermistor 3 resistance is calculated as follows:

$$R_{th} = R_r(t_{th}/t_r). \quad (4)$$

Once the resistance of thermistor 3 is known, temperature is readily obtained from a lookup table within microprocessor 6 since temperature is a known function of thermistor resistance.

Parallel port microprocessors are commercially available. In particular, the Intel Corporation type 8255 was used for realizing the temperature sensor of this invention. Microprocessors having ports that assign inputs and outputs on a bit-by-bit basis are recommended to conserve on the use of separate ports. The arrangement just described with reference to FIGS. 1, 2 and 3 is one of four possible variations for obtaining the same results. A second variation is realized with a positive potential applied to the lower end of capacitor 2 at pin 1 by initializing bits 0 and 1 at logical 1 instead of logical 0. Now capacitor 2 discharges. When bit 1 is made an input as before, bit 0 is set at logical 0. Capacitor 2 charges up through thermistor 3, and a 1/0 threshold is observed and measured. The same steps are repeated with the roles of bits 1 and 0 reversed to measure the charging threshold through reference resistor 4.

The remaining variations are implemented by grounding pin 1 at the lower end of capacitor 2. A set of RC time constant measurements is made with bits 0 and 1 initialized alternatively at logical 0 and logical 1. In the former instance capacitor 2 is first discharged and upon its recharging 0/1 threshold transistions are observed and in the latter instance capacitor 2 is first charged and upon its discharge the 1/0 threshold transitions are observed.

All four variations yield the same resistance measurements.

FIG. 4 of the drawing illustrates another configuration that can be implemented to achieve substantially the same result. Instead of using a third bit (e.g. bit 2) as before to sense the 0/1 threshold time, bit 1 can be used to sense the 0/1 threshold time of thermistor 3 and bit 0 can correspondingly be used to sense the 0/1 threshold time of precision resistor 4. The embodiment in FIG. 4 is advantageous in that only two output ports at bits 0 and 1 are required and no external power source is required. The outer terminal of capacitor 2 is grounded at location 10. However, in doing so, accuracy is sacrificed due to a variability existing in 0/1 threshold voltages between unique ports.

Referring to FIG. 5 of the drawings, additional temperature sensors are realized with the addition of one port (e.g., bit 3) and one thermistor 7 per sensor.

The condition sensor has application to any system measuring a form of energy through the use of a condition sensitive transducer, the resistance of which bears a known relationship to the condition or energy bing sensed. For example, it could be used for measuring position (e.g., joy stick), humidity levels, pressure, and the like. Since the condition sensor is not confined memrly to temperature applications, it is intended that all matter contained in the above description or shown in the accompanying drawing be interpreted as illustrative of the inventive concept and not by way of limitation.

What is claimed is:

1. A condition sensor comprising:
   a parallel multiport microprocessor;
   a potential source;
   a precision resistor having first and second ends, said first end being connected to a first port of said microprocessor;
   a condition responsive transducer whose resistance bears a known relation to the magnitude of the condition being sensed having first and second ends, said first end being connected to a second port of said microprocessor; and
   a capacitor having first and second ends, said first end being connected to said second ends of said resistor and of said transducer and said second end being connected to said potential source;
   said microprocessor determining the value of said condition from the ratio between threshold times for said capacitor to reach equivalent charge states through paths having respective time constants alternative resistor-capacitor and transducer-capacitor connections.

2. The condition sensor set forth in claim 1 in which a third port on said microprocessor connected to the first end of said capacitor serves as a sensing port.

3. The condition sensor set forth in claim 1 in which said transducer is a variable resistor the resistance of which bears a fixed relationship to the value of the condition being sensed.

4. The condition sensor set forth in claim 1 in which said microprocessor calculates the resistance of said transducer from the product of the resistance of said precision resistor and the ratio of times for equal exponential change in time constants of said capacitor and the respective precision resistor and transducer.

5. The condition sensor set forth in claim 1 in which the resistance $R_t$ of said transducer is calculated from the equation $$R_t = R_r(t_t/t_r),$$

where $R_r$ = resistance of said precision resistor, $t_t$ = time for said transducer and said capacitor to meet a predetermined threshold level detected by said microprocessor, and $t_r$ = time for said precision resistor and said capacitor to meet said predetermined threshold level.

6. The condition sensor set forth in claim 1 in which a further transducer sensing another condition is connected between a further port on said microprocessor and the first end of said capacitor.

7. The condition being sensor set forth in claim 1 in which the condition sensed is temperature and said transducer is a thermistor.

8. The condition sensor set forth in claim 1 in which said microprocessor includes accessible memory means for storing the relationship between the resistance being measured and the condition being sensed.

9. A temperature sensor comprising:

a potential source;

a parallel multiport microprocessor;

a precision resistor having first and second ends, said first end being connected to a first port of said microprocessor;

a thermistor means resistance bears a known relation to the magnitude of the temperature being sensed having first and second ends, said first end being connected to a second port on said microprocessor;

and a capacitor having first and second ends, said first end being connected to said second ends of said resistor and of said thermistor and said second end being connected to said potential source;

said microprocessor determining the temperature from the threshold times for said capacitor to attain equivalent charge states through paths having respective time constants of alternative resistor-capacitor and thermistor-capacitor connections thereto.

* * * * *